United States Patent [19]

Schimpf et al.

[11] 4,116,497
[45] Sep. 26, 1978

[54] APPARATUS FOR REDUCING TRACK NOISE IN A TRACK-TYPE VEHICLE

[75] Inventors: James E. Schimpf, Joliet; Roger L. Boggs, East Peoria; Malcolm H. Kinsinger, Washington, all of Ill.

[73] Assignee: Caterpillar Tractor Co., Peoria, Ill.

[21] Appl. No.: 696,456

[22] Filed: Jun. 16, 1976

[51] Int. Cl.² .......................................... B62D 55/22
[52] U.S. Cl. ....................................... 305/41; 305/47
[58] Field of Search .................................. 305/41–43, 305/47–49, 39, 60; 74/247, 250 R

[56] References Cited

U.S. PATENT DOCUMENTS

| 1,597,389 | 8/1926 | Penn | 305/47 |
| 2,398,630 | 4/1946 | Foot | 305/48 |
| 2,987,332 | 6/1961 | Bonmartini | 305/42 X |
| 3,387,897 | 6/1968 | Reid | 305/41 |

Primary Examiner—Robert B. Reeves
Assistant Examiner—John P. Shannon
Attorney, Agent, or Firm—Phillips, Moore, Weissenberger, Lempio & Strabala

[57] ABSTRACT

Apparatus for reducing the noise made by circulation of an endless drive chain comprising a plurality of substantially identical links about a drive sprocket and idler is disclosed. According to the invention, a substantial portion of the energy present in pivotal movement of adjacent links with respect to each other, which occurs as the links are received on the drive sprocket and idler, is absorbed and returned to the pivotal movement therebetween which occurs when the links leave their engagement with the drive sprocket and idler. Specific embodiments of the invention particularly suited for use in reducing track noise in a track-type vehicle are described.

13 Claims, 16 Drawing Figures

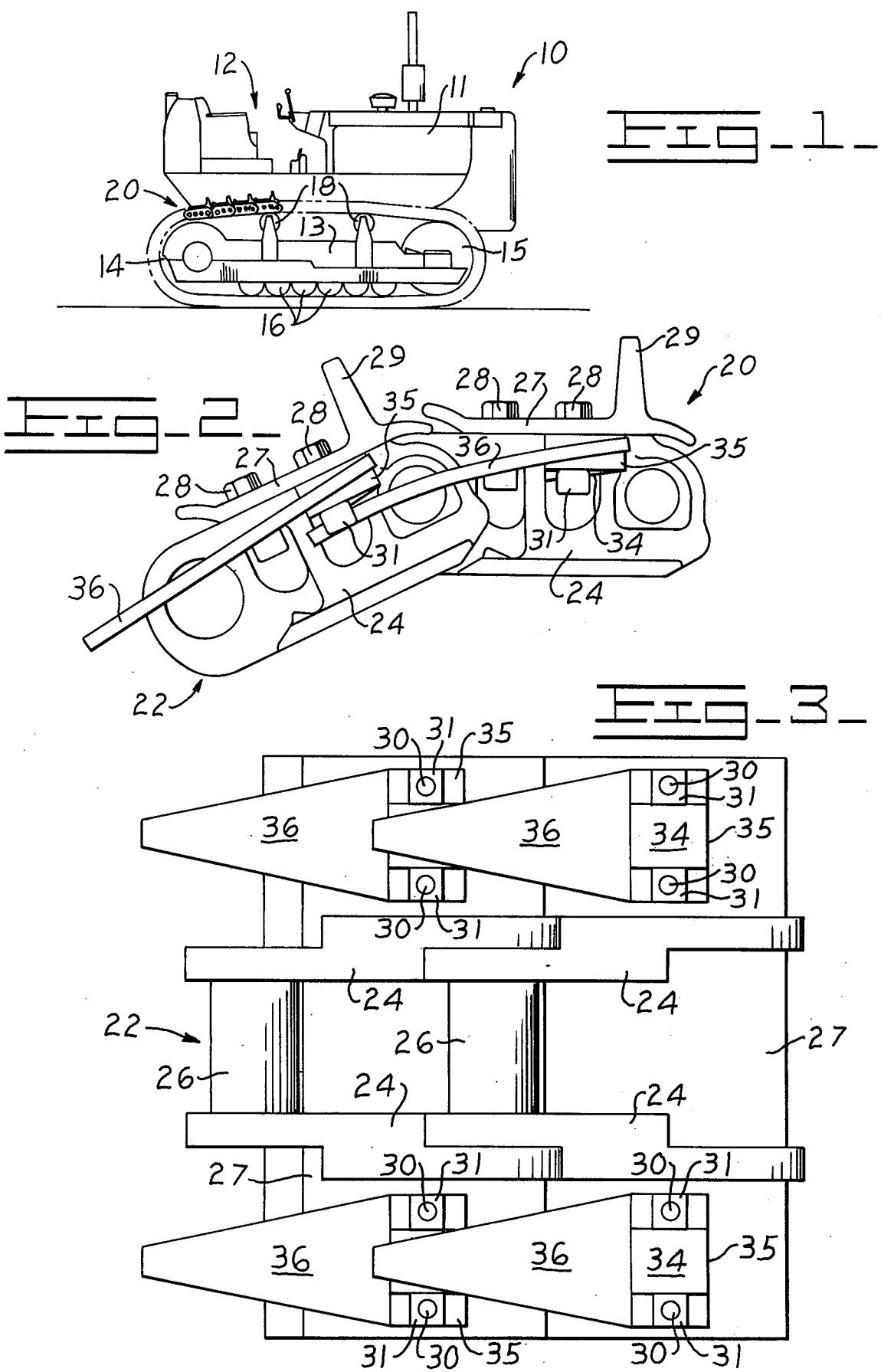

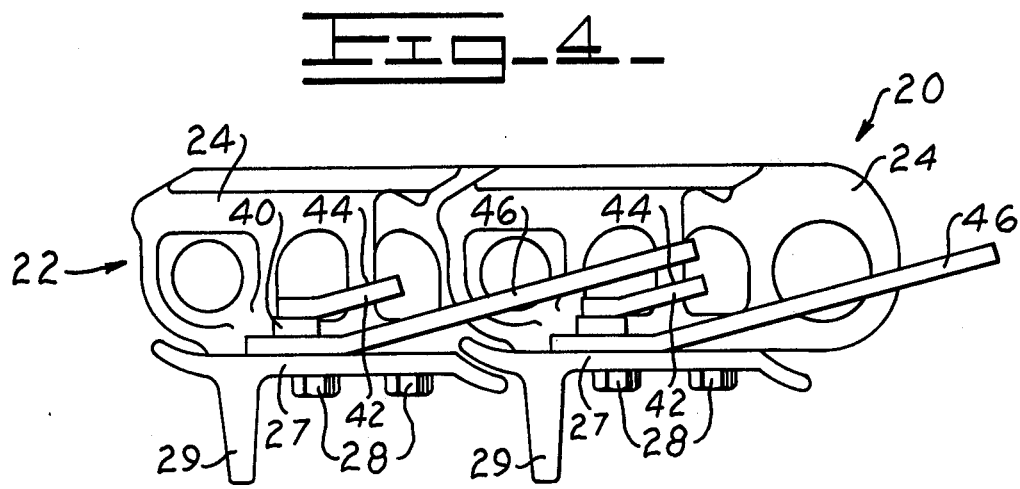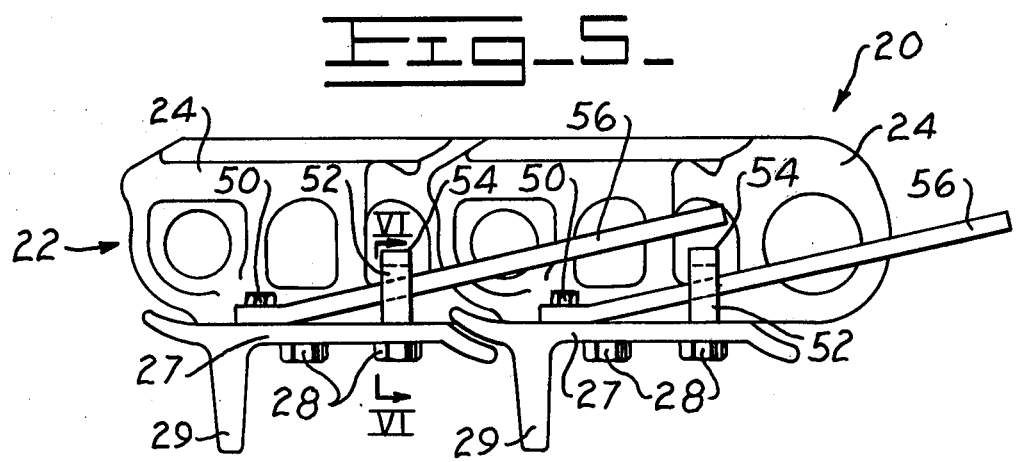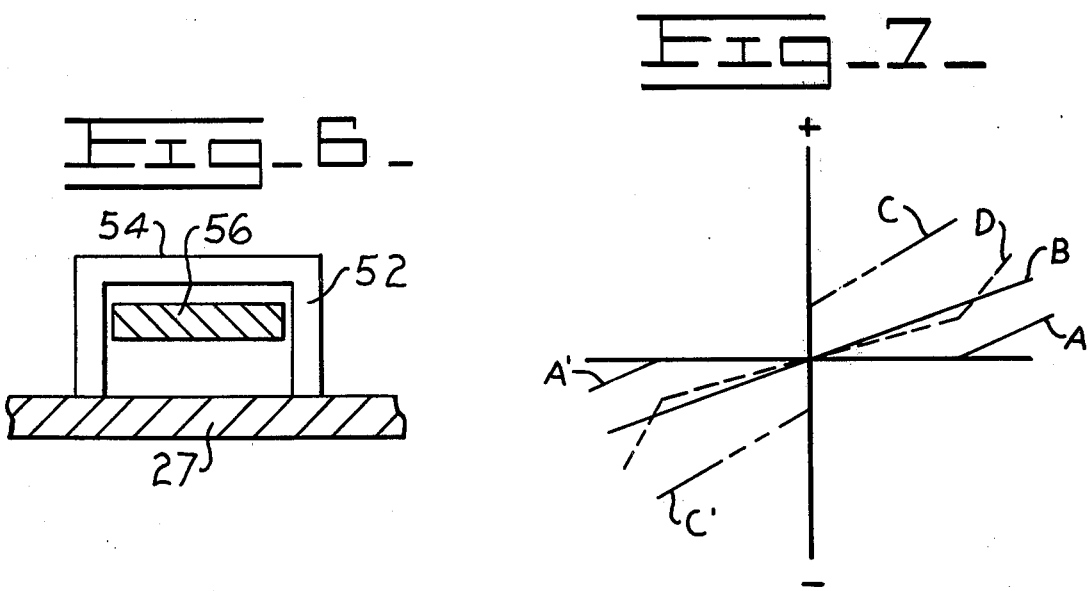

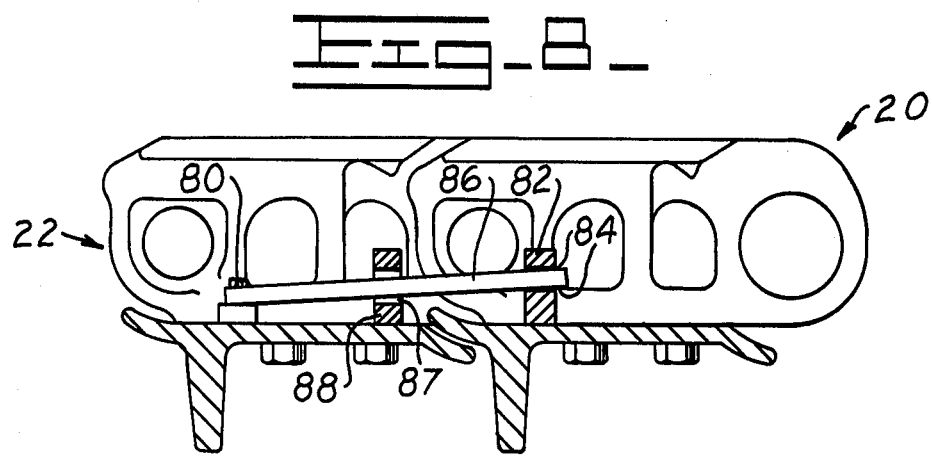
Fig_8_
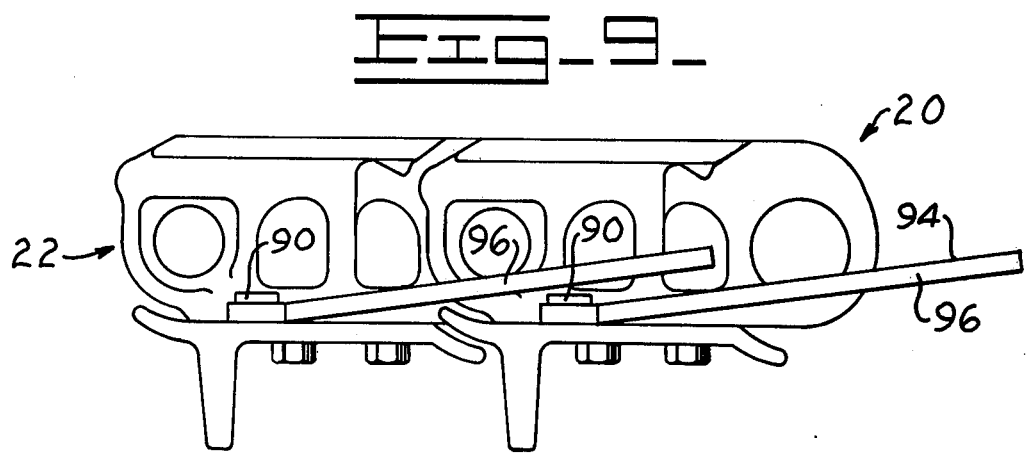
Fig_9_
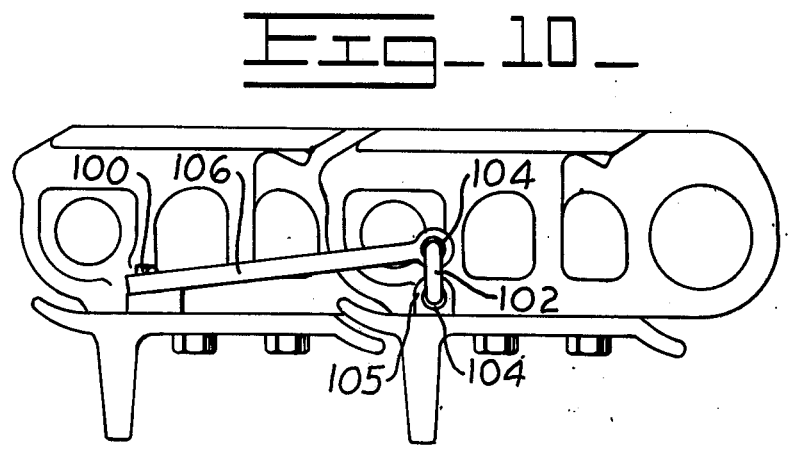
Fig_10_

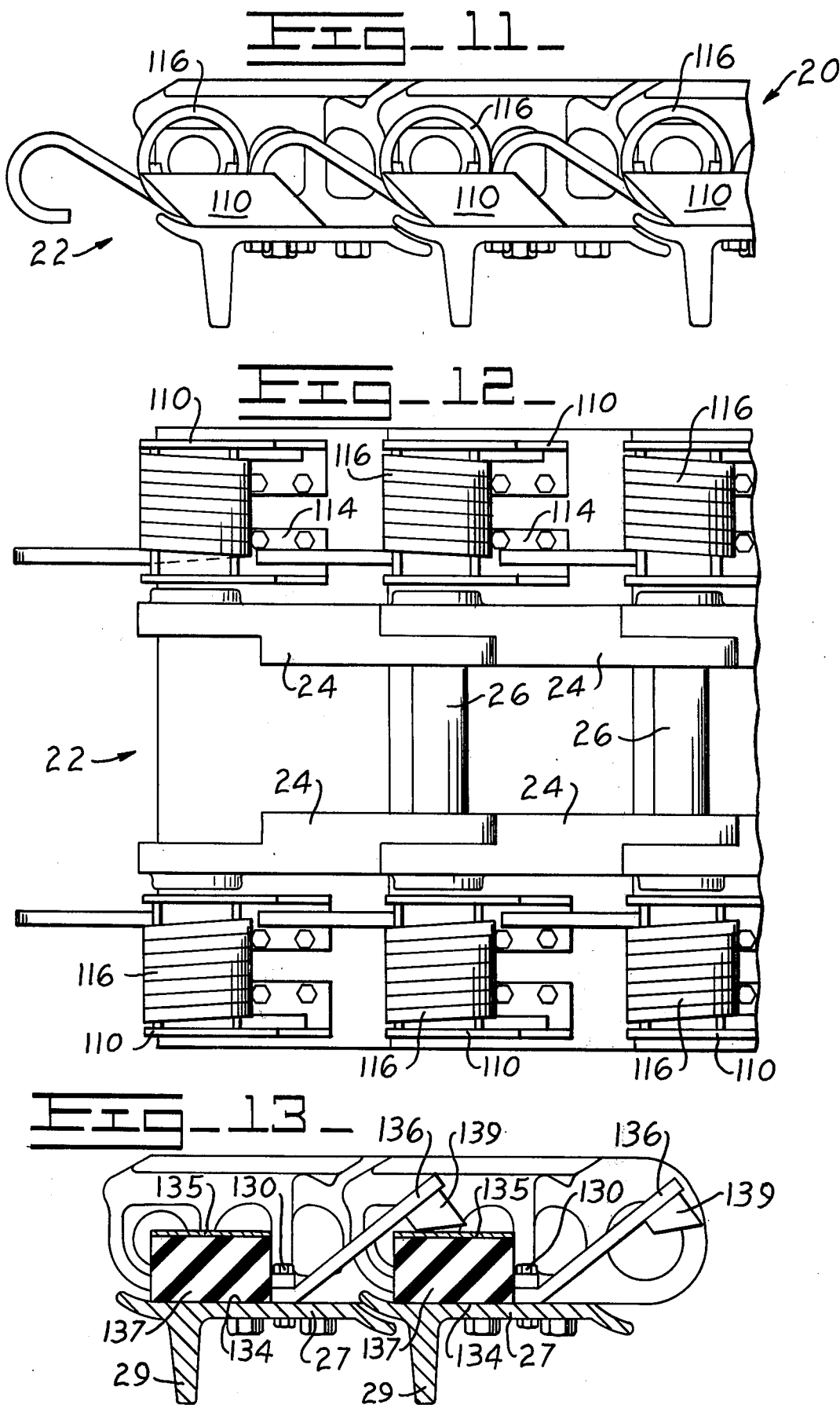

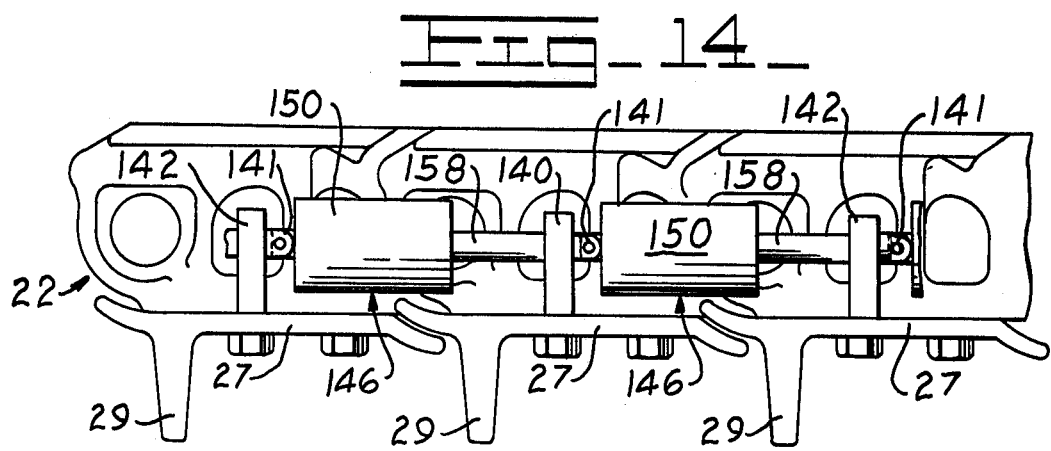
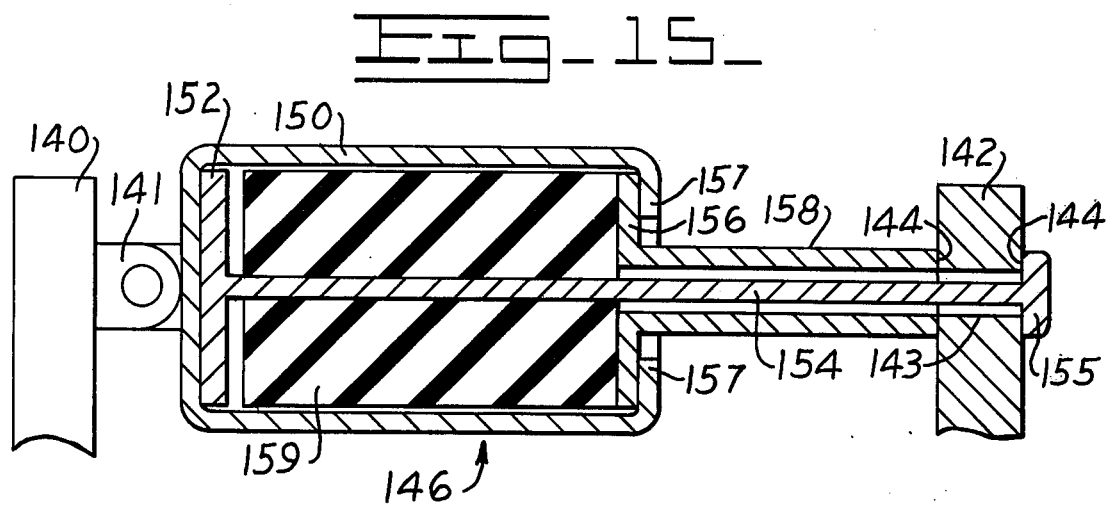
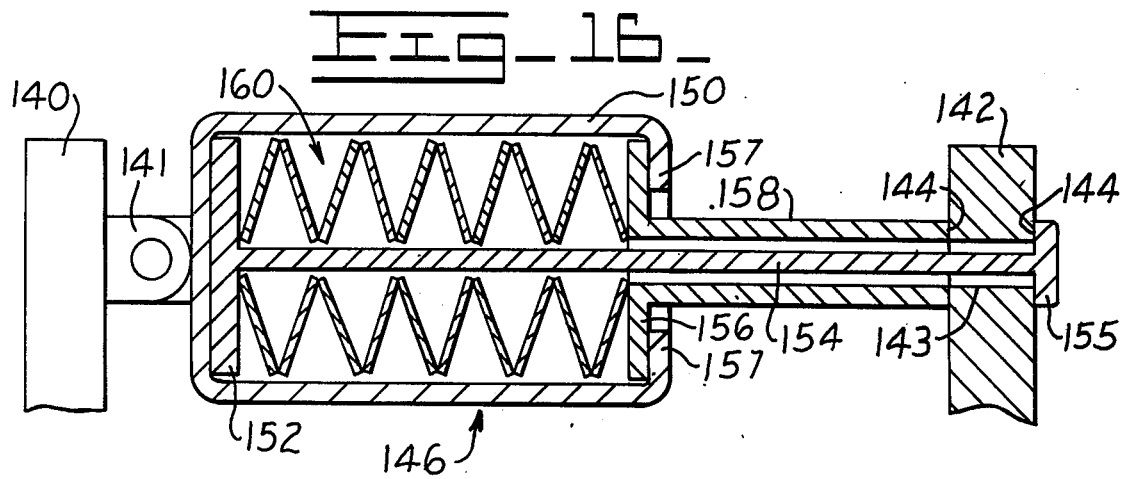

APPARATUS FOR REDUCING TRACK NOISE IN A TRACK-TYPE VEHICLE

BACKGROUND OF THE INVENTION

This invention relates to apparatus for reducing the noise made by the circulation of an endless drive chain about a drive sprocket and idler and more particularly to apparatus for reducing track noise in a track-type vehicle.

A major source of noise in the operation of a track-type vehicle is the tracks as they pass over the drive sprockets, front idlers and carrier rollers. Most of such track noise is generated by the impacting of the links and pintles of the drive chain incorporated in the track against the drive sprockets, idlers and rollers as the track is circulated during movement of the vehicle. Since the drive chain of the track is made of links which have a finite length, a true rolling motion is not achieved as the track passes around the drive sprockets and idlers and over the rollers. Instead, each link defines a chord in the circular motion of the track about the drive sprockets and idlers and the links pivot with respect to each other causing the pintles thereof to tend to impact against the drive sprockets and idlers as they enter into engagement therewith and the ends and pintles of the links to impact against the rollers as they pass thereover.

Where it is possible to tension the drive chain as by mounting the drive sprockets and idlers with their axes resiliently positioned with respect to each other in order to hold the drive chain taut, the above described source of noise may be avoided. However, in those applications requiring that the axes of the drive sprockets and idlers be rigidly mounted with respect to each other, a catenary will be present in the drive chain and the above described impacting action of the links and pintles against the drive sprockets and idlers will occur, resulting in the generation of noise.

It is common practice to use carrier rollers to support or reverse the catenary present in the chain. However, even where the carrier rollers are spring loaded in an attempt to tension the drive chain, the mass of the individual links is sufficient to produce impacts against the carrier rollers in addition to the drive sprocket and idler tending to add sources of noise generation.

Various attempts have been made in the prior art to reduce such noise by damping either the impact or the noise resulting from such impact. For example, drive sprockets and idlers filled with sand to damp the noise made by the impact of the links of the drive chain thereon have been proposed. However, it is not desirable to add to the size and weight of the sprockets and idlers or to reduce their structural strength by making them hollow to accommodate a noise damping material.

It is an object of this invention to reduce the noise made by circulation of an endless drive chain about a drive sprocket and idler without requiring structural modification of the drive sprocket and idler.

It has also been proposed to place energy absorbing material such as rubber between the drive chain and the drive sprockets and idlers associated therewith in order to damp the impact therebetween. For example, rings of rubber have been bonded to the peripheries of the sprockets, idlers and rollers for engagement by the drive chain. Although this method is effective in reducing the noise, it has been found that the wear of the rubber in operation is excessive, resulting in an impractically short life.

Similarly, it has been proposed that alternate teeth of the drive sprocket be dummy teeth made of rubber in order to absorb the impact energy of the links of the drive chain as they engage the sprocket. This approach is also effective in reducing noise but again, excessive wear results in an operating life too short to be practical.

It is another object of this invention to provide apparatus for reducing the noise made by circulation of an endless drive chain about a drive sprocket and idler which will have an operating life approaching that of the drive chain itself.

It is a further object of this invention to provide a apparatus for reducing the noise made by circulation of an endless drive chain about a drive sprocket and idler which will tend to recover the energy ordinarily lost in the impact of the drive chain on the sprocket and idler.

It is yet another object of this invention to provide a simple, inexpensive and easy to maintain apparatus for reducing the noise made by the circulation of an endless drive chain about a drive sprocket and idler which apparatus will have long life in operation and will exhibit a reduced tendency to be inactivated or become clogged during operation in mud, sand or under other severe environmental conditions.

SUMMARY OF THE INVENTION

According to this invention, the noise generated by circulation of an endless drive chain made of a plurality of substantially identical interconnected links about a drive sprocket and idler is reduced by absorbing a substantial portion of the energy present in the pivotal movement of adjacent links of the drive chain with respect to each other which occurs as they are received on the drive sprocket and idler, storing such energy while the adjacent links are in engagement with the drive sprocket and idler and finally returning such energy to the pivotal movement of adjacent links of the drive chain which occurs as they leave the drive sprocket and idler. Thus a plurality of mounting means are each rigidly fixed with respect to a different one of the links of the drive chain. Similarly, a plurality of engagement surfaces are each rigidly fixed with respect to a different one of the links of the drive chain and a plurality of elongated devices each extending across a different interconnection between a different one of the links and an adjacent link is carried at one end by the mounting means on the one link and extends over the engagement surface on the adjacent link. Each of the plurality of elongated members cooperates with the engagement surface associated therewith to resiliently oppose pivotal movement of the link on which it is mounted with respect to the adjacent link about the interconnection therebetween in at least one direction.

BRIEF DESCRIPTION OF THE DRAWING

The foregoing objects and features of this invention will be more clearly apparent from a reading of the following detailed description of preferred embodiments thereof when read in conjunction with the attached drawing wherein:

FIG. 1 is a side view in elevation of a track-type vehicle to which this invention may be applied with advantage with a portion of the track thereof shown in full and the remainder shown in phantom;

FIG. 2 is an enlarged side view in elevation of two of the links of the drive chain type track of the vehicle of FIG. 1 as modified in accordance with one embodiment of the teaching of this invention. The links of FIG. 2 are shown in their relative positions as they leave their engagement with the drive sprocket, the drive sprocket being omitted from FIG. 2 for purposes of clarity.

FIG. 3 is a bottom view of the two links of track as shown in FIG. 2.

FIG. 4 is a side view in elevation of two links of a drive chain type track shown in their ground engaging position after leaving the idler but before engaging the drive sprocket and illustrates a modification of the embodiment of this invention shown in FIGS. 2 and 3.

FIG. 5 is a side view in elevation similar to FIG. 4 but illustrating a further modification that may be made in the embodiment of this invention shown in FIGS. 2 and 3.

FIG. 6 is an enlarged cross-sectional view taken along line VI—VI of FIG. 5.

FIG. 7 is a diagram plotting the force exerted by various modifications of a preferred embodiment of the noise abatement means according to this invention against relative pivotal position of a pair of adjacent links with respect to each other.

FIG. 8 is an enlarged side view in elevation of a drive chain type track similar to that shown in FIG. 1 modified in accordance with another embodiment of the teaching of this invention and showing two links in their ground engaging position after leaving the idler but before engaging the drive sprocket, with the shoes thereof shown in section.

FIG. 9 is a side view in elevation similar to FIGS. 4 and 5 but showing a further modification that may be made in the embodiment of this invention as shown in FIGS. 2 and 3.

FIG. 10 is a side view in elevation similar to FIG. 8 but showing a modification that may be made in the embodiment of this invention as illustrated in FIG. 8.

FIG. 11 is a side view in elevation similar to FIG. 4 showing a further modification that may be made in the embodiment of this invention illustrated in FIGS. 2 and 3 and including a portion of a third link.

FIG. 12 is a top plan view of the drive chain track as shown in FIG. 11.

FIG. 13 is a side view in elevation similar to FIG. 4 but showing a further embodiment of the teaching of this invention.

FIG. 14 is a side view in elevation similar to FIGS. 8 and 10 but showing a third link and a further modification that may be made in the embodiment of this invention as shown in FIG. 8.

FIG. 15 is an enlarged cross-sectional view illustrating one form in which the enlongated noise abatement means of FIG. 14 may be made.

FIG. 16 is an enlarged cross-sectional view similar to FIG. 15 but illustrating another form in which the elongated noise abatement means of FIG. 14 may be made.

DETAILED DESCRIPTION OF PREFERRED EMBODIMENTS

Referring to FIG. 1, a track-type vehicle 10 to which the teaching of the subject may be applied with advantage is shown. As shown in FIG. 1, the vehicle 10 is a tractor including an engine 11 and an operator's seat and work station 12 carried on a frame 13. A pair of drive sprockets 14 are rotatably mounted at the rear end of the frame 13 and a pair of idlers 15 are rotatably mounted at the forward end of the frame 13 (only one of the sprockets 14 and idlers 15 being shown in FIG. 1). An appropriate drive mechanism (not shown in FIG. 1) interconnects the engine 11 and drive sprockets 14 to provide the motive power for the vehicle 10.

A pair of endless tracks 20 (only one of which is shown in FIG. 1 partially in full and partially in phantom) are each mounted about a different one of the pairs of sprockets 14 and idlers 15 as shown. The frame 13 is provided with a plurality of track rollers 16 rotatably mounted at the lower surface thereof between the sprocket 14 and idler 15 to engage the portion of the track 20 which is in engagement with the ground to thereby distribute the support of the vehicle 10 over a larger area. Two or more carrier rollers 18 may be mounted on the frame 13 and extend upwardly therefrom into engagement with the upper portion of the track 20 to counteract the catenary which would otherwise tend to occur in such upper portion of the track 20.

Referring to FIGS. 2 and 3, the track 20 comprises a drive chain 22 comprising a plurality of links which are identical except for a split link required to connect the ends of the chain in endless fashion. Each link comprises a pair of identical sides 24 interconnected with the sides of adjacent links at their ends by means of a pin and bushing 26 to form a roller type drive chain for engagement with the teeth of the drive sprocket 14 in the conventional manner.

A plurality of heavy metal plates or shoes 27 are each affixed to the outer surface of a different link of the track 20 as by means of bolts 28 which extend through the shoes 27 and into the sides 24 of the links. Each shoe 27 is provided with a heavy integrally formed grouser bar 29 to provide positive traction upon engagement of the shoe 27 with the ground.

The shoes 27 and link sides 24, as well as the pin and bushing interconnections 26 therebetween, are all made of heavy wear resistant steel. Thus, the track 20 comprises a plurality of link units pivotally interconnected with each other, each of which has a substantial mass. Upon circulation of the track 20 about the sprocket 14 and idler 15 on which it is mounted during movement of the vehicle 10, each of the link units of the track will sequentially engage the sprocket 14, carrier rollers 18, idler 15 and track rollers 16, returning again to the sprocket 14. However, there will be some play in the upper portion of the track 20 as it leaves the drive sprocket 14 and passes over the carrier rollers 18 into engagement with the idler 15. As each link unit of the track passes over the carrier rollers which prevent the formation of a catenary in the upper portion of the track 20 due to such play, they will tend to rock so that their ends impact on the rollers 18 producing a clatter. Similarly, the link units will tend to rock and one or both ends will tend to impact against the idler 15 upon engagement therewith. Due to the large mass of the link units and the velocity at which they must move in order to impart a usable ground speed to the vehicle 10, a substantial amount of energy is dissipated in the impacts as described above resulting from the pivotal movement of the link units with respect to each other and an undesirable amount of noise will be generated.

According to the teaching of this invention, the energy present in the pivotal movement of the link units of the track 20 with respect to each other is absorbed and stored for subsequent release. Thus, the force of impact of the link units upon the carrier rollers 18, idler 15 and drive sprocket 14 is reduced without appreciable loss of energy but with a substantial reduction in the noise which would otherwise be generated by circulation of the track 20. By appropriate design, the need for the carrier rollers 18 may be reduced or eliminated.

In accordance with the teaching of this invention, each link of the drive chain 22 of the track 20 is provided with a mounting means rigidly fixed with respect thereto. Each link of the drive chain 22 of the track 20 is also provided with an engagement surface rigidly fixed in relation thereto. A plurality of elongated noise abutment members are provided each of which extends between a different mounting means affixed to one link of the drive chain 22 and a different engagement surface affixed to an adjacent link in the drive chain 22. One end of the elongated noise abutment member is carried by the mounting means associated therewith and the other end of the elongated noise abatement member is adapted to resiliently oppose pivotal movement of the adjacent links with respect to each other by engagement of the other end of the elongated member with the engagement surface at least upon engagement of the adjacent links with the drive sprocket 14 and idler 15.

More specifically, and referring to FIGS. 2 and 3 of the drawing, according to a preferred embodiment of this invention a mounting means may be rigidly fixed with respect to the links of the drive chain 22 by means of the shoes 27 as by providing studs 30 and nuts 31 on the opposite side of the shoes 27 from the grouser bars 29. Similarly, an engagement surface may be provided on the opposite side of the shoes 27 from the grouser bars 29 as by means of an inclined surface 34 on the exterior of a clamping means 35 mounted on the shoes 27 by means of the studs 30 and nuts 31. The elongated noise abatement member may comprise an elongated resilient cantilever spring 36 having one end captured by the clamping means 35 associated with one link and with the free end thereof extending over the inclined surface 34 of the clamping means 35 associated with an adjacent link.

As best shown in FIG. 2, pivotal movement of the links of the drive chain with respect to each other as the track engages the drive sprocket 14 and idler 15 will be resiliently opposed by the elongated cantilever spring member 36 resulting in the storage of energy in such cantilver spring member 36. This will result in there being less energy in the impact of the links upon the idler 15 and drive sprocket 14 when the links enter into engagement therewith and a consequent reduction in the noise produced by such impacts. Similarly, the tendency of the links to impact upon the carrier rollers 18 will be resisted by the resilient action of the cantilever spring members 36. As the links of the drive chain leave their engagement with the idler and sprocket 14, the energy stored in the elongated spring members 36 will be returned to the pivotal movement of the links without producing noise since no impact will be involved.

As shown in FIG. 3, the shoes 27 project from both sides of the drive chain 22 thus enabling the provision of a pair of mounting means engagement surfaces and elongated noise abatement members for each link of the drive chain. However, it is pointed out that the objects of this invention may be accomplished by providing a single mounting means, engagement surface and elongated noise abatement member for each link of the drive chain and all located at one side of the drive chain. Alternatively, the mounting means, engagement surfaces and elongated noise abatement members for adjacent links could be located on alternate sides of the drive chain.

Basic considerations in the design of a noise abatement means in accordance with the teaching of this invention include the amount of movement or deflection required of the elongated noise abatement member such as the cantilever spring 36, the distribution of stress in the elongated member and the space available for the mounting and operation of the noise abatement means as determined by such factors as the thickness of the drive chain, the length of the links of the drive chain and other mechanisms and structures in contact with or adjacent the drive chain. As shown in FIG. 3, the elongated cantilever spring 36 may be shaped (i.e., trapezoidal in plan view) in order to provide a desired deflection and stress distribution. Similarly, the deflection and stress distribution in the cantilever spring member 36 may be adjusted by changing the length thereof and the positioning of the mounting means and engagement surface with respect to the interconnection between the links. As shown in FIG. 3, the length and mounting of the cantilever spring member 36 is essentially centered with respect to the interconnection between adjacent links.

Referring to FIG. 4, a modification of the embodiment of this invention as shown in FIGS. 2 and 3 to provide additional effective motion or deflection of the elongated noise abatement member is shown. Thus, in FIG. 4, an engagement surface 44 is provided by a resilient member 42 which may be mounted on the opposite sides of the shoes 27 from the grouser bars 29 together with elongated cantilever spring members 46 by a mounting means 40 including a stud projecting from the shoe 27 as described hereinabove. Thus, pivotal movement of the adjacent links of the drive chain 22 with respect to each other upon engagement with the drive sprocket and idler will cause the elongated resilient member 46 to engage the surface 44 of the resilient member 42, resulting in deflection of both members and a distribution of the stress therebetween.

FIG. 5 illustrates a different modification which may be made in the embodiment of this invention shown in FIGS. 2 and 3. As shown in FIG. 5, the engagement surface 54 may be provided by a rigid U-shaped bracket 52 having its legs affixed to the shoes 27 and receiving an elongated resilient member 56 through the bight portion thereof. One end of the elongated resilient member 56 is carried by a mounting means 50 similar to that described hereinabove and the free end of the resilient member 56 projects over the engagement surface 54 of the bracket 52 mounted on the next adjacent shoe 27. Thus, upon pivotal movement of the adjacent links with respect to each other when they engage the drive sprocket and idler the free end of the resilient member 56 mounted on the shoe 27 of one link will be brought into contact with the engagement surface 54 of the bracket 52 mounted on an adjacent link and will resiliently oppose further pivotal movement of the links with respect to each other.

As shown in FIGS. 4 and 5, the free ends of the resilient members 46 and 56 are spaced from the engagement surfaces 44 and 54 thus allowing a certain amount of free pivotal movement between adjacent lengths of the drive chain as they engage the sprocket and idler before further pivotal movement is resiliently opposed. Referring to FIG. 6, the height of the bracket 52 may be sufficient to allow full deflection of the resilient member 56 without bringing it into contact with the bottom thereof in which case the stress introduced into the resilient member 56 will increase at a constant rate with the pivotal movement of the links after the resilient member 56 has been brought into contact with the engagement surface 54.

Thus, referring to FIG. 7, the solid line A represents the stress that will be introduced in the resilient members 46 and 56 where stress is plotted on the ordinate and pivotal movement of the links with respect to each other is plotted on the abscissa of the graph shown in FIG. 7. As shown in FIGS. 2, 4 and 5, the normal pivotal movement of a leading link of the drive chain with respect to the next adjacent following link upon engagement with the drive sprocket and idler will be toward the inside of the drive chain and such pivotal movement is represented to the right of the ordinate in the graph of FIG. 7 with the resulting stress in the noise abatement means of this invention induced thereby being shown as a positive stress.

It may, of course, be desirable in certain applications for the resilient members 46 and 56 to be in contact with the engagement surfaces 44 and 54 when the longitudinal axes of the links are in alignment with each other as shown in FIGS. 4 and 5. In this case, the portion of the line B to the right of the ordinate of the graph of FIG. 7 would represent the stress induced in the resilient members 46 and 56 upon normal pivoting of the links with respect to each other. It would also be possible to prestress the elongated resilient spring members 36, 46 and 56 of FIGS. 2, 4 and 5, respectively, against the engagement surfaces 34, 44 and 54, respectively, in which case the phantom line C to the right of the ordinate in FIG. 7 would represent the total stress in the resilient members 36, 46, 56 plotted against pivotal movement of adjacent links. However, such an arrangement might tend to cause oscillating pivotal movement between adjacent links of the drive chain under the influence of the resilient members 36, 46 and 56.

Such tendency toward oscillating pivotal movement may be overcome to some extent by the embodiment of this invention shown in FIG. 8. In the embodiment of FIG. 8, a single noise abatement means is associated with each interconnection between adjacent links in a drive chain and the location of such noise abatement means is alternated on opposite sides of the drive chain. In FIG. 8 and subsequent Figures, the structure of the track 20 and drive chain 22 is the same as in prior Figures and the reference numerals pertinent thereto are omitted in favor of clarity in illustration.

In the embodiment of FIG. 8, one end of an elongated resilient member 86 is mounted on a shoe by mounted means 80 similar to that described above and the free end of member 86 is captured between engagement surfaces 84 on opposite sides thereof which may be provided by an appropriate bracket 82 mounted on an adjacent shoe as shown in cross-section in FIG. 8. In addition, the resilient member 86 is received through an enlarged opening 87 in a bracket 88 mounted intermediate the ends of the resilient member 86 as shown in cross-section in FIG. 8. The resilient member 86 is not prestressed when the adjacent links of the drive chain have their longitudinal axes aligned as shown in FIG. 8, but the opening 87 through the bracket 88 is dimensioned so that deflection of the resilient member 86 will bring the intermediate portion thereof into contact with either the upper or lower surfaces of the opening 87, depending on the direction of pivotal movement between the links.

Thus, the dotted line D shown in FIG. 7 represents the total stress induced in the resilient member 86 upon pivotal movement of the adjacent links of the drive chain. It will be seen that a dual rate spring action is provided by the embodiment of this invention shown in FIG. 8 and that stress is induced in the resilient member 86 upon pivotal movement of the adjacent links in either direction as indicated by the extension of line D on both sides of the ordinate in FIG. 7. Thus, the adjacent links of the drive chain are urged toward their position as shown in FIG. 8 through the action of the resilient member 86 with the rate of increase of stress in the resilient member 86 being fairly small when the links first pivot away from such position. When pivotal movement of the adjacent links causes them to assume relative positions which depart radically from that shown in FIG. 8, the stress induced in the resilient member 86 will increase at a greater rate. Thus, the tendency toward oscillating pivotal movement about the position of the links shown in FIG. 8 is reduced and yet any substantial departure from such position is strongly opposed.

Referring to FIG. 9, a dual rate spring action may also be obtained in modifications of the embodiment of this invention shown in FIGS. 2 through 6 by providing elongated resilient members 96 which are mounted at one end on the shoes by mounting means 90 and adapted to interact with each other. Thus, as shown in FIG. 9, the engagement surface 94 is provided by a surface of the right hand elongated resilient member 96 which is contacted by the free end of the left hand elongated resilient member 96. Thus, the stress induced in the left hand resilient member 96 will tend to increase at a given rate when the left hand link is pivoted with respect to the right hand link upon engagement with the drive sprocket or idler and subsequently at a greater rate when the right hand link enters into engagement with the drive sprocket or idler causing it to pivot with respect to the following link (not shown).

Referring to FIG. 10, a modification of the embodiment of this invention as shown in FIG. 8 and capable of providing the stress action as represented by the dotted line B in FIG. 7 is shown. It will be seen that the resilient member 86 of FIG. 8 must slide between the surfaces 84 of the bracket 82 upon pivoting movement of the links of the drive chain with respect to each other. Such movement will tend to produce wear of the engagement surfaces 84. In the modification shown in FIG. 10, a resilient member 106 is mounted at one end on a shoe by mounting means 100 and a spring shackle 102 interconnects appropriate openings in the free end of the resilient member 106 and an appropriate bracket 105 and rubber grommets 104 surround the spring shackle 102 to provide the engagement surfaces. Upon pivoting of the adjacent links of the drive chain in either direction, the spring shackle 102 will pivot within the grommets 104 and the resilient member 106 will be stressed. The stress induced in the resilient member 106 is represented by the solid line B in FIG. 7 on both sides of the ordinate, it being understood that the resilient member 106 is not stressed when the adjacent links are in their relative positions shown in FIG. 10. The rubber grommets 104 prevent metal to metal contact in order to further damp noise and to reduce wear since they may be protected against the entry of foreign matter by appropriate design.

FIGS. 11 and 12 illustrate a further modification which may be made in either the embodiments shown in FIGS. 2 through 6 or the embodiment shown in FIG. 10. As shown in FIGS. 11 and 12, a torsion spring is substituted for the elongated resilient members FIGS. 2 through 6 and 10. An appropriate mounting bracket 110 mounts the axis of the cylindrical portion of the torsion spring 116 in coaxial alignment with the pin and bushing interconnection 26 between adjacent links in the drive chain 22. One end of the torsion spring 116 projects from the cylindrical portion thereof and across the interconnection so that it extends over an appropriate engagement surface 114 on an adjacent link. As discussed hereinabove in connection with FIGS. 2 through 6, the torsion spring 116 may or may not be prestressed when the adjacent links of the drive chain are in their relative positions as shown in FIG. 11. If the torsion spring 116 is not prestressed, and its opposite ends are rigidly fixed to the mounting means 110 and engagement surface 114, respectively, it will function in substantially the same manner as the embodiment of this invention shown in FIG. 10. A torsion spring has the advantage of being compact and yet providing large deflection and good stress distribution.

Referring to FIG. 13, a further embodiment of this invention is shown in which the elongated noise abatement means is made in two parts, one of such parts being a block of resilient material 137 mounted in engagement with the opposite surface of a shoe 27 from the grouser bars 29 and the other part being an elongated member 136 which may be rigid. The elongated member 136 is mounted at one end by mounting means 130 with the free end thereof provided with a head 139 in contact with the block 137 of resilient material and upon pivotal movement of adjacent links of the drive chain with respect to each other the head 139 of elongated member 136 will compress the block of resilient material 137 against the surface 134 of the shoe 27 with which it is in engagement. The upper surface of the block 137 of resilient material may be provided with an appropriate wear resistant covering 135 and the block 137 of resilient material may be prestressed or not, as desired, when the adjacent links of the drive chain are in the relative position shown in FIG. 13. Thus the embodiment of this invention shown in FIG. 13 will function in essentially the same manner as the embodiment shown in FIGS. 2 through 6.

Referring to FIGS. 14 through 16, two forms of a further modification of the embodiment of this invention described in connection with FIG. 8 are shown. According to the modification of FIGS. 14 through 16, the mounting means 140 comprises a plurality of upright members each rigidly fixed at one end to a different shoe 27 on the opposite side thereof from the grouser bar 29. An attachment bracket 141 is provided on one side of the upright member 142 adjacent the free end thereof. Similarly, the engagement surfaces are provided by a plurality of upright members 142, each rigidly fixed at one end to a different shoe 27 on the opposite side thereof from the grouser bar 29. The upright members 142 are provided with an aperture 143 therethrough adjacent the free end thereof. The upright members 140 and 142 are in alignment with each other longitudinally of the drive chain 22 but are spaced from each other on the shoe 27 laterally of the drive chain 22 and the relative positions of the upright members 140 and 142 alternate with each other on adjacent shoes 27 according to the modification shown in FIG. 14. A plurality of elongated noise abatement members 146 are each connected between a different upright member 140 on one link and a different upright member 142 on an adjacent link across the interconnection between such links.

Referring to FIGS. 15 and 16, each elongated noise abatement member comprises a hollow cylindrical cup-like member having its bottom pivotally mounted to an upright member 140 by means of the bracket 141. A first pressure plate 152 is mounted within the cylindrical cup 150 adjacent the bottom thereof and has a centrally disposed rod 154 projecting out of said cylindrical cup 150 coaxially therewith. The rod 154 extends through the aperture 143 in the upright member 142 and terminates in a head 155 which abuts the engagement surface 144 on the opposite side of the upright member 142 from the cup 150. A second pressure plate 156 is mounted within the cup 150 adjacent the open end thereof and is captured within the cup 150 by means of inturned lips 157, for example. The second pressure plate 156 is provided with a centrally disposed tubular projection 158 which coaxially surrounds the rod 154 and extends to a free end in abutment with the engagement surface 144 on the side of the upright member 142 adjacent the cup 150. The pressure plates 152 and 156 are mounted for axial movement within the cup 150 and a resilient means is interposed therebetween within the cup and about the rod 154.

As shown in FIG. 15, the resilient means may comprise a solid block 159 of resilient material such as rubber and as shown in FIG. 16, the resilient means may comprise a Belleville spring arrangement 160 about the rod 154. The length of the upright members 140 and 142 and the spacing of the bracket 141 and aperture 143 from the free ends thereof are selected so that the axis of the cup 150 lies between the shoes 27 and the axes of the pin and bushing interconnections between adjacent links. Thus, upon pivotal movement of adjacent links with respect to each other in the normal direction when the adjacent links engage the drive sprocket and idler, the upright members 140 and 142 will be tilted toward each other and the second pressure plate 156 will be forced toward the bottom of the cup 150, stressing the resilient member and holding the first pressure plate 152 against the bottom of the cup. The rod 154 will, of course, project from the upright member 142 through the aperture 143 and the upright members 140, 142 and elongated noise abatement members 146 must be dimensioned and positioned so that the head 155 of the rod 154 will not contact an adjacent cup member.

Upon pivotal movement of adjacent links with respect to each other in the opposite direction, the upright member 142 will act against the head 155 of the rod 154 tending to pull the first pressure plate 152 away from the bottom of the cup 150, stressing the resilient means between the pressure plates and holding the second pressure plate 156 against the lips 157 of the cup 150. Thus the dimensions and positioning of the upright members 140, 142, the bracket 141 and the aperture 143 must be selected to avoid contact between an upright member 142 and an adjacent cup 150.

Referring specifically to FIG. 15, it will be seen that the block 159 of rubber does not completely fill the space between the pressure plates 152 and 156. Thus a certain amount of free pivotal movement of adjacent links of the drive chain 22 from their positions as shown in FIG. 14 is permitted. Thus, referring to FIG. 7, the stress induced in the block 159 of rubber is represented by the solid lines A and A' on opposite sides of the ordinate, depending on the direction of pivotal movement.

Referring specifically to FIG. 16, it will be seen that the Belleville spring arrangement 160 completely fills the space between the pressure plates 152 and 156. The Belleville spring arrangement may be prestressed to force the first pressure plate 152 against the bottom of the cup 150 and the second pressure plate 156 against the lips 157. Thus, referring to FIG. 7, the phantom lines C and C' on opposite sides of the ordinate represent the stress induced in the Belleville spring arrangement upon pivotal movement of adjacent links of the drive chain 22 of the track 20 in the respective directions.

The arrangement of FIG. 16 will tend to be most effective in avoiding the formation of a catenary in the track during operation and may eliminate the need for the carrier rolls 18. The same result might be accomplished by the arrangement shown in FIG. 15 which will also tend to damp any tendency for pivotal oscillations of adjacent links with respect to each other about the positions thereof shown in FIG. 14. It will be seen that block 159 and Belleville spring arrangement 160 will be protected from the environment by the cup member 150 thus tending to insure long life in operation even under severe environmental conditions.

It is believed that those skilled in the art will make obvious adaptations of the teaching of this invention to suit particular applications thereof. Specifically, the method of this invention may be accomplished by means other than those specifically shown in the drawing and described hereinabove so long as such means include the essential elements of this invention as disclosed herein.

What is claimed is:

1. In a track for a track-type vehicle, said track comprising an endless drive chain made of a plurality of interconnected substantially identical links, means for reducing the noise made by circulation of said track during movement of said track-type vehicle comprising a plurality of elongated devices, means projecting laterally of said drive chain for rigidly mounting each of said plurality of elongated devices to a different one of said plurality of links and a plurality of engagement surfaces projecting laterally of said drive chain each rigidly fixed with respect to a different one of said plurality of links, either or both said plurality of elongated devices and said plurality of engagement surfaces comprising resilient material, said plurality of elongated devices each extending between a different one of said mounting means and a different adjacent one of said engagement surfaces with one end thereof being carried by said mounting means, said elongated devices each extending across an interconnection between a different one of said links and a link adjacent thereto in said drive chain and cooperating with said engagement surface to resiliently oppose pivotal movement of said one link and said adjacent link in at least one direction with respect to each other about said interconnection therebetween.

2. Means for reducing noise in a track for a tracktype vehicle as claimed in claim 1 wherein said plurality of elongated devices comprises a plurality of cantilever spring members.

3. Means for reducing noise in a track for a track-type vehicle as claimed in claim 2 wherein said cantilever spring members are constant cross-section cantilever beams.

4. Means for reducing noise in a track for a track-type vehicle as claimed in claim 1 wherein said plurality of engagement surfaces each rigidly fixed with respect to a different one of said plurlity of links comprise a plurality of ground engaging shoes each rigidly fixed across the outer surface of a different one of said plurality of links and extending laterally of said drive chain on at least one side.

5. Means for reducing noise in a track for a track-type vehicle as claimed in claim 1 wherein said plurality of mounting means each rigidly fixed with respect to a different one of said plurality of links comprise a plurality of ground engaging shoes each rigidly fixed across the outer surface of a different one of said plurality of links and extending laterally of said drive chain on at least one side.

6. Means for reducing noise in a track for a track-type vehicle as claimed in claim 1 wherein said plurality of elongated devices comprises a plurality of torsion springs each having an end portion extending rectilinearly therefrom.

7. Means for reducing noise in a track for a track-type vehicle as claimed in claim 1 wherein said plurality of elongated members each comprise a first rigid portion and a second resilient portion adapted to resiliently engage said first portion to oppose said pivotal movement.

8. Means for reducing noise in a track for a track-type vehicle as claimed in claim 1 wherein each of said plurality of elongated devices and associated engagement surface cooperate to resiliently oppose said pivotal movement of said one link and said adjacent link in both directions with respect to each other about said interconnection therebetween.

9. Means for reducing noise in a track for a track-type vehicle as claimed in claim 1 wherein said elongated devices are prestressed to exert a force on said engagement surface acting outwardly of said endless drive chain, said at least one direction of said pivotal movement being inwardly of said drive chain, and there being at least one elongated device extending across each interconnection between each of said plurality of links and an adjacent link.

10. In an endless drive chain made of a plurality of interconnected substantially identical links mounted for circulation about a drive sprocket and an idler, means for reducing the noise resulting from said circulation of said endless drive chain comprising a plurality of engagement surfaces projecting laterally of said drive chain each rigidly fixed with respect to a different one of said plurality of links, a plurality of elongated members and means projecting laterally of said drive chain for rigidly mounting each of said plurality of elongated members to a different one of said plurality of links either or both said plurality of elongated members and said plurality of engagement surfaces comprising resilient material and said plurality of elongated members each extending across a different interconnection between a different one of said plurality of links and an adjacent link in said drive chain and each extending between said mounting means on said one link and said engagement surface on said adjacent link, each of said elongated members cooperating with said engagement surface to resiliently oppose the pivotal movement of said one link and said adjacent link with respect to each other about said interconnection therebetween upon engagement thereof with said drive sprocket and idle upon circulation of said drive chain.

11. Means for reducing the noise in a drive chain as claimed in claim 10 wherein said plurality of elongated members each have one end rigidly fixed to a different one of said mounting means.

12. Means for reducing the noise in a drive chain as claimed in claim 11 wherein said plurality of elongated members comprises a plurality of cantilever springs each having its free ends in sliding engagement with a different one of said plurality of engagement surfaces.

13. Means for reducing the noise in a drive chain as claimed in claim 11 wherein said plurality of elongated members each comprise a resilient portion and a rigid portion.

* * * * *